PULSE GENERATOR EMPLOYING PLURAL PULSE FORMING NETWORKS PROVIDING OVERLAPPED PULSES TO EFFECT RIPPLE CANCELLATION

Filed March 14, 1963

GLENN F. GROTZ
MICHAEL J. COYLE,
*INVENTORS.*

BY Harry M. Saragovitz
Edward J. Kelly
Herbert Berl
Charles Wells

United States Patent Office 3,189,837
Patented June 15, 1965

3,189,837

PULSE GENERATOR EMPLOYING PLURAL PULSE FORMING NETWORKS PROVIDING OVERLAPPED PULSES TO EFFECT RIPPLE CANCELLATION

Glenn F. Grotz, Huntington Station, and Michael J. Coyle, Bay Shore, N.Y., assignors, by mesne assignments, to the United States of America as represented by the Secretary of the Army

Filed Mar. 14, 1963, Ser. No. 265,600
3 Claims. (Cl. 328—162)

This invention relates to pulse forming circuits and more particularly it relates to a pulse forming circuit for supplying very high voltage pulses to microwave transmitter tubes such as klystrons, traveling wave tubes or magnetrons.

There have been many circuits devised for supplying high voltage pulses to electronic devices. However, such circuits have not been entirely satisfactory, particularly when used to supply a pulse to a microwave transmitter tube, because of the pronounced ripple on the top of the high voltage pulse. This is objectionable in that the ripple on the high voltage pulse supplied to the microwave transmitter results in an irregularity in the waveform of the output signal from the microwave transmitter.

The invention described herein provides a pulse generating circuit wherein the ripple on the output pulse is reduced a considerable extent, thus resulting in a pulse having a more satisfactory waveform. Briefly, this is accomplished by discharging two pulse forming networks across a microwave transmitter with the pulse from one of the networks being delayed so that it will be out of phase with the pulse from the other network. Each of the pulses will have the objectionable ripple, but inasmuch as the ripples are out of phase they will match and cancel one another to result in a much flatter pulse being supplied to the microwave transmitter.

An object of this invention is to provide a pulse forming circuit for supplying high voltage pulses to an electronic device.

Another object of this invention is to provide a pulse forming circuit wherein the ripple on the output pulse therefrom has been substantially reduced.

Figure 1:
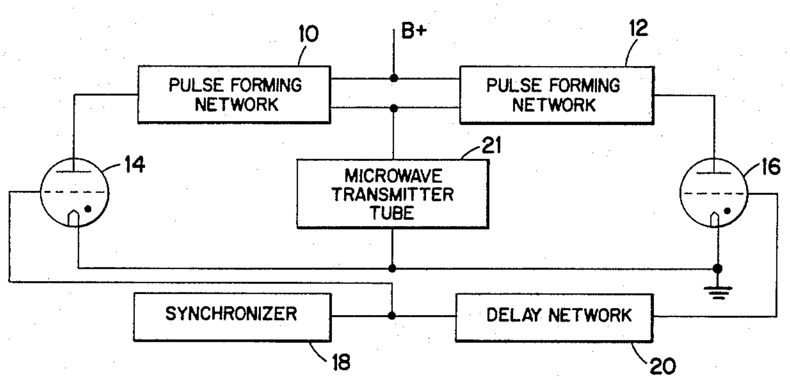

Other and further advantages of this invention will be apparent as the description thereof progresses, reference being had to the accompanying drawings, wherein:

FIGURE 1 is a schematic diagram of a preferred embodiment of the invention.

FGURE 2 is a schematic diagram of a second embodiment of the invention.

Referring to FIGURE 1, pulse forming networks 10 and 12 are connected so as to discharge through a microwave transmitter tube 21. The pulse forming networks are resonantly charged to the B+ voltage in a conventional manner from a power supply rated at one half the B+ voltage. Pulse forming networks 10 and 12 are triggered, respectively, by thyratron switch tubes 14 and 16 discharge across the microwave transmitter. A trigger pulse from synchronizer 18 is applied to the grid of each of the switch tubes to trigger the same. A delay network 20 is connected between synchronizer 18 and switch tube 16 to slightly delay the firing thereof with respect to switch tube 14. This in turn delays the output pulse of network 12 with respect to the output pulse of network 10. The output pulse from network 12 is delayed to the extent that the ripples on the pulses from the two pulse forming networks are approximately 180 degrees out of phase. The matching and cancellation which occurs between the pulses from the two networks is not completely effective; however, the resultant pulse applied to the microwave transmitter has considerably less ripple than the output pulses provided by the pulse forming networks. The amount of delay necessary between the firing of the two switch tubes depends upon the frequency of the ripple on the pulses delivered by the pulse forming networks, which frequency in turn depends upon the number of sections employed in the pulse forming networks.

Figure 2:
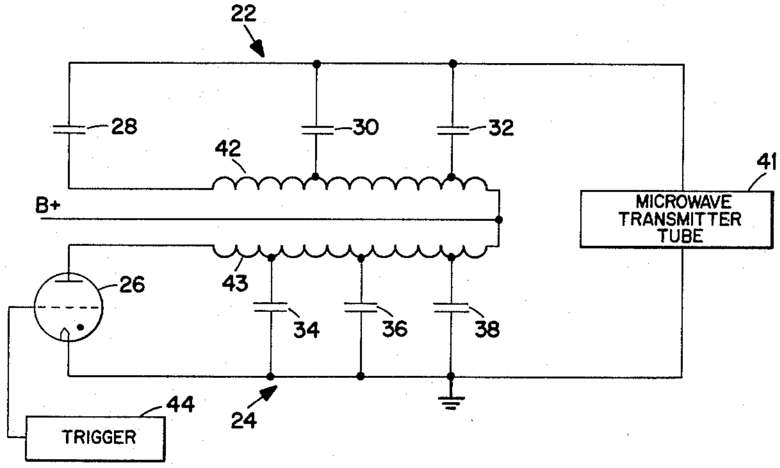

The pulse forming circuit illustrated in FIGURE 2 is essentially a Blumlein type of pulse circuit, as disclosed in U.S. Patent No. 2,496,979 issued to A. D. Blumlein, and includes two pulse forming networks 22 and 24 which are charged in parallel from a source B+. Pulse forming networks 22 includes three capacitors 28, 30 and 32 connected in parallel with respect to one another and each of these capacitors have one of their terminals commonly connected in series with microwave transmitter tube 41 and the other of their terminals connected to taps on coil 42. Pulse forming network 24 includes three similarly connected capacitors 34, 36 and 38 and thyratron switch tube 26 which has its plate connected to a tap on coil 43 and its cathode series connected to a microwave transmitter tube 41. A trigger 44 provides trigger pulses for firing the thyratron and discharging the pulse forming networks across the microwave transmitter.

In operation, the pulse forming networks 22 and 24 are charged in parallel by source B+. When it is desired to pulse microwave tube 41 a trigger signal is supplied to the grid of thyratron 26 from trigger circuit 44. When thyratron 26 starts conducting network 24 becomes a short circuited delay line with the right hand end of the network (FIG. 2) being the input end. Since it is a characteristic of short circuited delay lines that an output signal appears at the input terminals thereof in an inverted state with respect to the input signal, it is seen that the signal appearing at the right hand end of network 24, after thyratron 26 becomes conducting, has a polarity opposite that of the signal originally applied to the network. The voltage on network 24 has therefore been "flipped." This inverted voltage then causes microwave tube 41 to conduct, permitting network 22 to discharge through tube 41 in series with network 24. Network 22 discharges in series with network 24 because this network is an open circuit delay line which does not invert the signal as does a short circuited delay line. A standard pulse having the objectionable ripple will be produced if the capacitance of pulse forming network 22 is equal to the capacitance of pulse forming network 24. However, by increasing the capacitance of capacitor 32 the discharge time of pulse forming network 22 is delayed with respect to the discharge time of pulse forming network 24. This results in the ripples on the output pulses from the pulse forming networks being out of phase, i.e., staggered in a cancelling manner, so that the ripple on the pulse delivered to the microwave transmitter is reduced in amplitude. The ripple can be reduced something on the order of forty percent by properly increasing the capacitance of capacitor 32. A similar ripple reduction can be had by adjusting the inductance of pulse forming network 22 rather than adjusting the capacitance.

This completes the description of the invention described herein. However, many modifications thereof will be apparent to one skilled in the art without departing from the spirit and scope of this invention. Accordingly, it is desired that the invention described herein be limited only by the appended claims.

We claim:

1. A pulse generating circuit for supplying an improved pulse to an electronic device comprising:

(a) a first pulse forming network connected to said electronic device, (b) a second pulse forming network connected to said electronic device, (c) means connected to said first and second pulse forming networks for charging said networks to a desired potential, (d) means for triggering said first and second pulse forming networks for generating first and second pulses, and (e) means applying said pulses to said electronic device in overlapping relationship whereby the wave form of the resulting pulse applied to said electronic device is substantially free of ripple.

2. A pulse forming circuit for supplying an improved pulse to an electronic device, comprising:

(a) a first pulse forming network having a plurality of capacitors connected in parallel, (b) an electronic switching device connected in parallel with said network, (c) a second pulse forming network having a plurality of capacitors connected in parallel, (d) said first and second pulse forming networks being series connected and series coupled to the electronic device, (e) means connected to said first and second pulse forming networks for charging said networks to a desired potential, (f) trigger means connected to said electronic switching device to discharge said pulse forming networks across the electronic device, and (g) said second pulse forming network having a different time constant than said first pulse forming network, whereby the pulse delivered by said second pulse forming network will be delayed and result in a much flatter pulse being supplied to said electronic device.

3. A pulse forming circuit for supplying an improved pulse to a microwave transmitter tube comprising:

(a) a pair of pulse forming networks for generating electrical pulses and connected in series with the microwave transmitter tube, (b) a pair of electronic switching devices connected in series with respective ones of said pulse forming networks to discharge said pulse forming networks across the microwave transmitter tube, (c) means connected to the pulse forming networks for charging said networks to a desired potential, (d) means connected to said switching devices for triggering said switching devices thereby applying said pulses to said tube, and (e) delay means for delaying the discharge of one of said pulse forming networks with respect to the other of said pulse forming networks, for making said pulses out of phase with each other to such an extent that ripple occurring in the top of said pulses will be cancelled, whereby said tube receives a signal from said pulse forming networks that is substantially free of ripple.

References Cited by the Examiner

UNITED STATES PATENTS

| | | | |
|---|---|---|---|
| 2,448,364 | 8/48 | Ganz et al. | 307—106 |
| 2,496,979 | 2/59 | Blumlein | 328—67 |
| 2,749,452 | 6/56 | Katzin | 307—106 |
| 2,791,751 | 5/57 | Fine et al. | 333—20 |
| 2,898,482 | 8/59 | Busch | 328—63 |
| 3,021,487 | 2/62 | Kestenbaum | 328—165 |

FOREIGN PATENTS

| | | |
|---|---|---|
| 135,186 | 11/40 | Australia. |

ARTHUR GAUSS, *Primary Examiner.*